Figure 1:
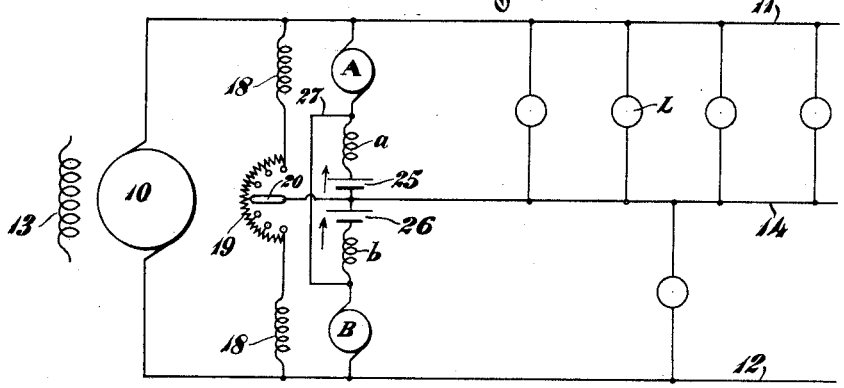

G. B. SCHLEY.
SYSTEM OF DISTRIBUTION.
APPLICATION FILED FEB. 6, 1908.

1,010,961.

Patented Dec. 5, 1911.

2 SHEETS—SHEET 1.

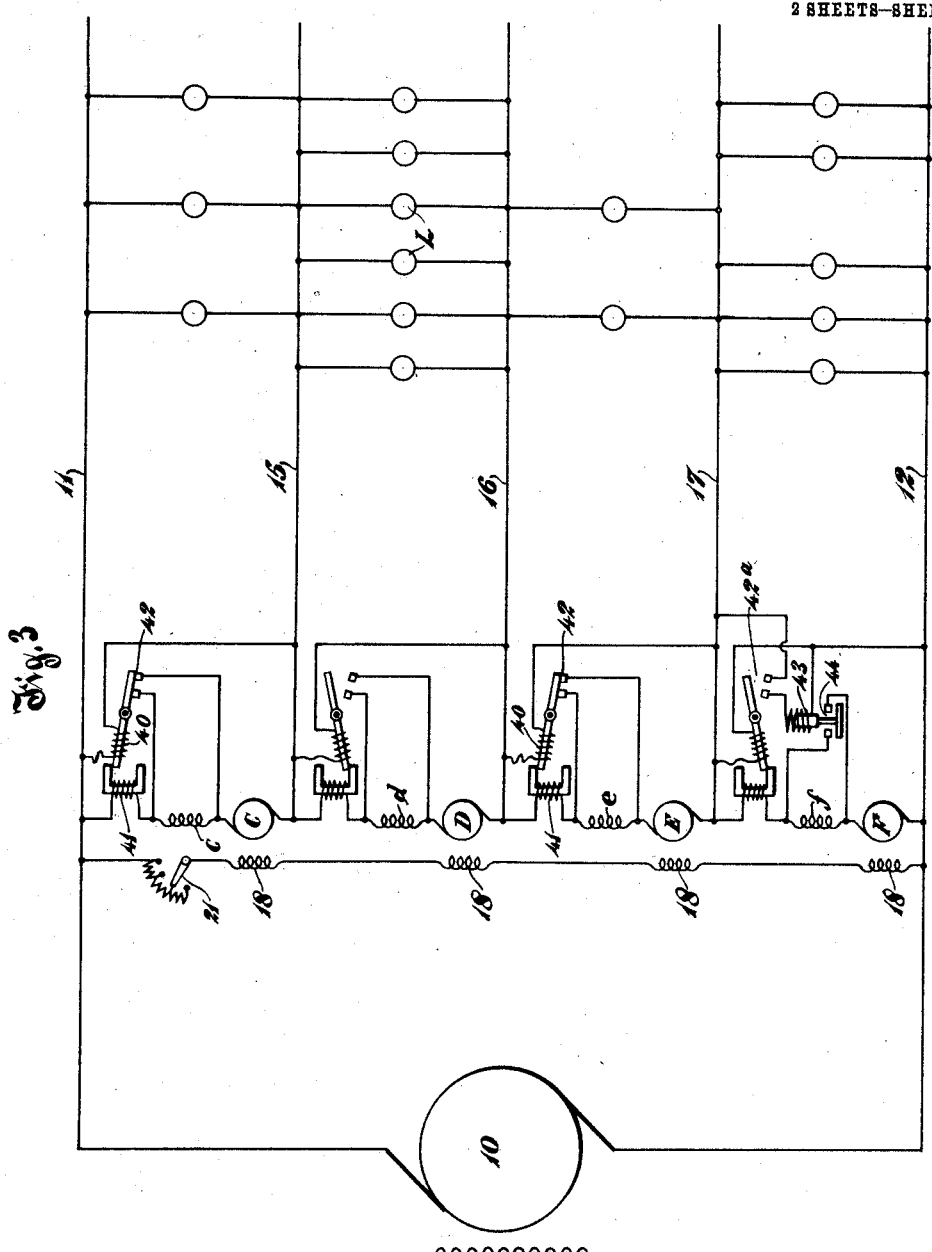

UNITED STATES PATENT OFFICE.

GEORGE B. SCHLEY, OF NORWOOD, OHIO, ASSIGNOR TO ALLIS-CHALMERS COMPANY, A CORPORATION OF NEW JERSEY.

SYSTEM OF DISTRIBUTION.

1,010,961. Specification of Letters Patent. Patented Dec. 5, 1911.

Application filed February 6, 1908. Serial No. 414,551.

*To all whom it may concern:*

Be it known that I, GEORGE B. SCHLEY, citizen of the United States, residing at Norwood, in the county of Hamilton and State of Ohio, have invented certain new and useful Improvements in Systems of Distribution, of which the following is a full, clear, and exact specification.

My invention relates to multiple voltage systems of distribution having any number of feeder conductors and circuits, and is a modification of the arrangement shown in the patent to David Hall, No. 883,195, granted March 31, 1908.

In multiple voltage systems it is customary to employ a balancer, as it is commonly called in the art, consisting of two or more dynamo-electric machines mechanically connected together and each electrically connected across one pair of conductors of the system. As is well known, when the currents in the different branches of the system are equal or balanced, said dynamo-electric machines run as motors without load and with slight losses. When said currents become unequal, current flows through one or more compensating conductors, and one or more of said machines are driven as generators to supply current to the branch or branches having the heavier current or currents in order to maintain the voltages at substantially their proper values.

On account of the inherent regulating qualities of compound-wound machines, it is desirable to employ compound-wound dynamo-electric machines in the balancer set, in order that upon unbalancing of the currents the generator or generators of the balancer set may supply current at increased voltage as such unbalancing increases. Since the current through the armature and series field windings of any machine of the balancer is in opposite directions when said machine is acting as generator and as motor, and since the series and shunt fields of the machine must be cumulative when it acts as generator, it follows that the fields are differential when it acts as motor. In other words, the machines acting as generators have cumulative fields and as motors have differential fields. The degree of compounding action depends on the value of the current in the compensating conductor or conductors. But as a motor having differentially wound fields may race or run away on current overload, it becomes desirable or even absolutely necessary that the series field windings of the machines of a compound-wound balancer set be cut out when such machines are acting respectively as motors, as otherwise an excessive unbalancing would cause the balancer to run away, thus unduly raising the voltage on the branch or branches carrying the greater currents. An admirable arrangement for doing this is shown in the aforesaid patent to Hall.

It is the object of my present invention so to modify and improve the Hall arrangement that, in the first place, the system is more widely applicable to multiple voltage systems having more than three wires and, in the second place, no moving parts in the controlling arrangement are necessary. This object is completely attained by placing a shunt or shunts around the series field windings and so arranging asymmetric cells that current will flow through the series field winding of any machine only when such machine is acting as a generator. This can readily be done, because the direction of current in the motor armature and series field winding reverses as the machine changes from motor to generator or vice versa. The first feature of the object, however, may be accomplished by providing a plurality of polarized relays with the coil in which the current may reverse connected in series with the armature of that machine which it controls and between the same pair of conductors.

The various novel features of my invention will appear from the description and drawings and will be particularly pointed out in the claims.

Figure 2:
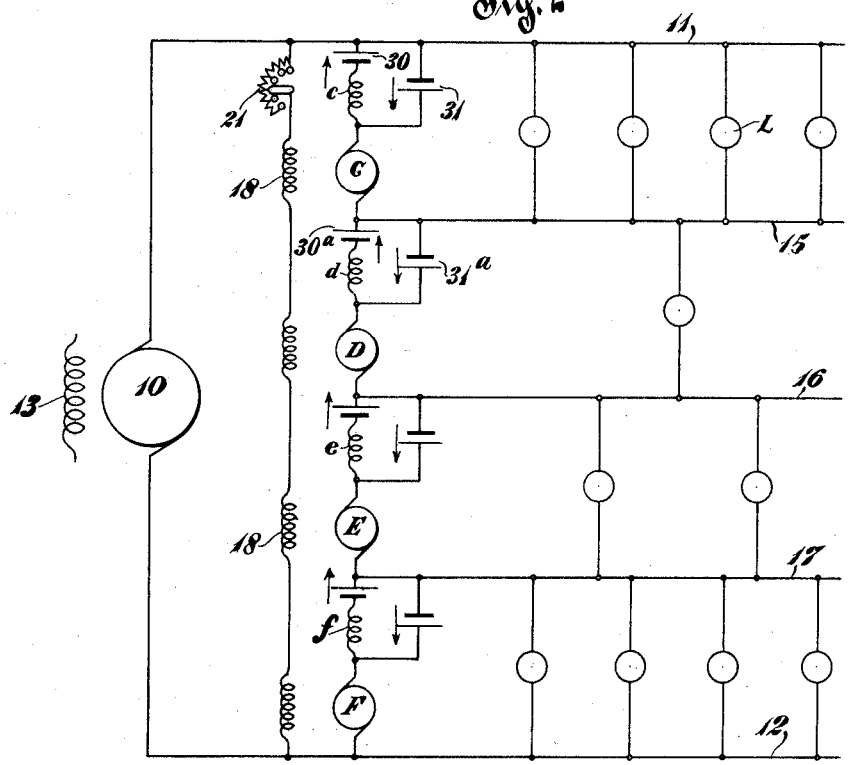

Figure 1 shows diagrammatically an arrangement of my invention which is particularly applicable to three wire systems; Fig. 2 shows diagrammatically an arrangement which is applicable to multiple voltage systems having any number of branches; and Fig. 3 shows the arrangement with the polarized relays.

In all of the figures the source of current 10, here shown as a single generator though any desired number of generators may be used, supplies the main conductors or legs 11 and 12 of a multiple voltage distributing circuit. The generator or generators 10 are excited by field windings 13, which may be connected in any desired manner, series, shunt, compound, or to a separate source. A balancer, consisting of a plurality of compound-wound dynamo-electric machines mechanically connected together, has its armatures and series field windings connected in series across the mains 11 and 12. At a point between each two machines of the balancer is connected a neutral or compensating conductor, there being one such conductor, 14, in Fig. 1 and three such conductors, 15, 16, and 17, in Figs. 2 and 3. The shunt field windings 18 of the balancer may be controlled in any desired manner, two methods being shown by way of example. In Fig. 1 a resistance 19 is connected between the two shunt field windings, and an arm 20 is connected to the compensating conductor 14 and is movable over a series of buttons connected to different points of the resistance 19. This method allows the relative strengths of the field windings to be varied. In Figs. 2 and 3 a rheostat 21 is in series with all of the shunt field windings 18 and varies their strengths correspondingly. Any other method of regulating the shunt field windings of the balancer may be used.

In Fig. 1 the balancer comprises but two dynamo-electric machines, the two armatures A and B being connected directly to the mains 11 and 12 respectively, while the series field windings $a$ and $b$ are connected between the two armatures and at their ends remote from the armatures are also connected to the neutral conductor 14. However, between these series field windings respectively and the neutral conductor are two asymmetric cells 25 and 26, which allow current to pass, say, in the upward direction only. A shunt 27 joins the two armature terminals remote from the main conductors, and thus shunts the series field windings $a$ and $b$.

In the operation of the system of Fig. 1 suppose that the current taken by the upper branch of the system is heavier than that taken by the lower branch, as indicated. In order to maintain the proper voltages between the neutral conductor and the outside conductors it is therefore necessary that the armature B run as motor to drive the armature A as generator. Assuming the upper side of the generator 10 to be the positive side, part of the excess or unbalanced current demanded by the upper branch of the system will flow from such generator through the main conductor 11, the lights or other load L to the neutral conductor 14, upward through the asymmetric cell 25 and series field winding $a$, through the shunt 27 and armature B to the main conductor 12 and the generator 10. This current through the armature B will drive it as motor, but because the asymmetric cell 26 prevents' downward flow of current through it the series field winding $b$ is cut out and the motor B acts as a shunt motor. In addition to the circuit above described, the armature A supplies a current which flows upward to the main conductor 11, through the load L to the neutral conductor 14, and upward through the asymmetric cell 25 and the series field winding $a$ to the armature A. This latter current is the other part of such excess or unbalanced current. Thus the series winding $a$ carries the full current of the neutral conductor, which is the sum of the currents in the two armatures A and B and the difference between the currents in the two branches of the system, and the machine A will run as a compound-wound generator. With the series field $b$ cut out there is no danger that the balancer will run away.

If the current taken by the lower side of the system is heavier than that taken by the upper side of the system, the machine A will run as motor while the machine B runs as generator, and the asymmetric cell 25 will prevent current from passing through the series field winding $a$, thus making the machine A a shunt wound motor, while the asymmetric cell 26 allows current to pass through the series field $b$, thus making the machine B a compound-wound generator. In this case the current for both armatures A and B passes through the field winding $b$.

In Fig. 2 the balancer consists of four machines, having armatures C, D, E, and F and series field windings $c$, $d$, $e$, and $f$ respectively, and shunt field windings 18. In each machine of the balancer the series field winding and the armature are connected in series between two of the conductors of the system, as armature C and field winding $c$ between the conductors 11 and 15. Each series field coil is connected in series with an asymmetric cell 30, while it is shunted by a conductor containing another asymmetric cell 31, the two asymmetric cells being oppositely connected. Thus, for instance, the cells 30 in series with the various series field windings will allow upward flow of current only, while the cells 31 in shunt to these field windings will allow downward flow of current only.

In the operation of the arrangement in Fig. 2, each series field coil carries only the current taken by its associated armature when the latter is acting as generator, but carries no current, or substantially no current, when such armature is acting as motor. On account of the electrical and mechanical connections each machine will act as generator or motor accordingly as the current in the branch across which it is connected is higher or lower than the average current in all the branches. Thus with the load as indicated the machine C will automatically act as generator. Assuming as before that the upper side of the generator 10 is positive, the machine C will generate current which will flow upward through its series field winding $c$, the asymmetric cell 30, conductor 11, the lights or other load L between the conductors 11 and 15, and through the latter conductor to the armature C. The machine C therefore acts as a compound-wound generator, the asymmetric cell 31 preventing its series field winding $c$ from being short-circuited. However, the current taken by the branch of the system between conductors 15 and 16 is comparatively light, and therefore the machine D will act as a motor, taking part of the current which goes through the lights L in the uppermost branch of the system. This current starts from the source 10, goes through the lights L to the conductor 15, through the asymmetric cell $31^a$ and the armature D to the conductor 16, and on down through the other machines and lights to the lower main conductor 12 and the source 10. The asymmetric cell $30^a$ will prevent any flow of current in the series field winding $d$. The machine D thus acts as a shunt motor. Similarly each machine of the balancer will act as motor or generator as the conditions require, being in effect shunt wound when motor and compound wound when generator.

In Fig. 3, as in Fig. 2, the balancer consists of the four machines C, D, E, and F, with the armature and series field winding of each machine of the balancer connected in series between two of the conductors of the system. A polarized relay is provided for each machine of the balancer, and this relay has a polarizing coil 40 connected in any desired manner, and a coil 41, which is responsive to reversals of current, connected in series with the armature and series field winding of that machine and between the two conductors of the system across which that machine is connected. This polarized relay is arranged when in one position either to shunt the series field winding of its associated machine directly, as by means of the switch 42, shown for each of the upper three branches of the system, or by means of the switch $42^a$ to close the circuit of the actuating coil 43 of an electromagnetically operated switch 44 in shunt to such series field winding, as shown for the lowest branch of the system.

When any of the machines of the balancer is acting as motor, the relative direction of current in the two coils of the relay is such that the relay will shunt or cause to be shunted the series field winding of that machine, as shown in the first and third branches of the system counting from the top. When any of the machines of the balancer is acting as generator the relative direction of current in the two coils of the relay is such that the relay will break or cause to be broken the shunt around the series field winding, as shown in the second and fourth branches of the system counting from the top.

My invention as arranged in Figs. 2 and 3 is applicable to any multiple voltage system, regardless of the number of branches of the system; and as arranged in any of the figures is applicable whether the voltages on the various branches are all equal or unequal. Thus, for instance, in Fig. 1 the voltage on the two branches of the system may be 110 volts on each branch as in a standard lighting system, or 90 and 160 volts respectively as in one form of commercial multiple voltage power system. The asymmetric cells used may be of any desired or suitable character.

Many modifications may be made in the precise arrangements here shown and described without departing from the spirit and scope of my invention, and all such I aim to cover in the following claims.

What I claim as new is:—

1. In a multiple voltage system of distribution, two main conductors, a neutral or compensating conductor, a balancer including a plurality of compound-wound dynamo-electric machines connected to said conductors, and asymmetric conductors for automatically cutting out of service one of the field windings of one of said machines when the ratio of the loads between the different conductors departs from normal.

2. In a multiple-voltage system of distribution, more than two feeder conductors, a balancer consisting of a plurality of compound-wound dynamo-electric machines mechanically connected together and electrically connected to the conductors of the system, and asymmetric conductors for rendering inoperative the series field of that machine which drives another as a generator when the currents become unbalanced.

3. In a multiple voltage system of distribution, more than two feeder conductors, a plurality of compound-wound dynamo-electric machines connected to said conductors and adapted to act as motors or generators to supply current to the branch or branches of the system which carry the heaviest currents to maintain the voltages at the proper values, and asymmetric conductors for shunting the series field of any of said machines when such machine is acting as motor.

4. In a multiple voltage system of distribution, a plurality of conductors, a balancer consisting of a plurality of compound-wound dynamo-electric machines connected to said conductors, and asymmetric conductors for cutting out one of the field windings of one of said dynamo-electric machines when the currents in the different branches of the system are unbalanced.

5. In a multiple voltage system of distribution, a plurality of conductors, a balancer consisting of a plurality of compound-wound dynamo-electric machines connected to the conductors of the system, and asymmetric conductors connected to the series field windings of said machines for preventing flow of current through said fields save when said machines are acting as generators.

6. In a multiple voltage system of distribution, more than two conductors, a balancer consisting of a plurality of compound-wound dynamo-electric machines connected to said conductors, and asymmetric conductors connected and arranged to cut out of service the series field winding of any one of said machines when such machine is acting as motor.

7. In a multiple voltage system of distribution, two main conductors, a neutral conductor, a balancer set including two dynamo-electric machines connected to said three conductors, series and shunt field windings for said machines, and asymmetric conductors arranged to cut out the various series field windings save when the respective machines with which they are connected are acting as generators.

8. In a multiple voltage system of distribution, a plurality of feeder conductors including two main conductors and a compensating or neutral conductor, a balancer including two dynamo-electric machines connected to said conductors for supplying the balancing current, shunt and series field windings for each of said machines, the field windings of each machine being arranged to assist when such machine is acting as generator, and asymmetric conductors for preventing reversal of current in any of said series field windings.

9. In a multiple voltage system of distribution, a plurality of conductors, a balancer comprising a plurality of compound-wound dynamo-electric machines connected to said conductors for supplying the balancing current, means for shunting the series field windings of said machines, and asymmetric conductors for rendering said shunting means effective only when the machines are respectively acting as motors.

10. In a multiple voltage system of distribution, more than two conductors, a balancer comprising a plurality of compound-wound dynamo-electric machines connected between different pairs of said conductors to supply the balancing current, and an asymmetric conductor in series with the series field winding of each machine for preventing current flow in said field winding save when that machine is acting as generator.

11. In a multiple voltage system of distribution, more than two feeder conductors, a balancer comprising a plurality of compound-wound dynamo-electric machines connected to said conductors, means for shunting the series field winding of said machines, and an asymmetric conductor associated with each machine for causing said shunting means to shunt the series field winding of that machine only when the latter is acting as motor.

12. In combination, a plurality of dynamo-electric machines mechanically connected to drive each other and to run individually as either motors or generators, a field winding for each of said machines, and an asymmetric conductor associated with said field winding for preventing a flow of current therethrough save when that machine is running as generator.

13. In combination, a plurality of dynamo-electric machines mechanically connected to drive each other and arranged to run individually either as motors or generators, a plurality of field windings for each of said machines, and an asymmetric conductor arranged to cause the shunting of one of the field windings of each machine when that machine is running as motor.

14. In combination, a plurality of dynamo-electric machines connected to drive each other and arranged to run individually as either generators or motors, shunt and series field windings for each of said machines, and an asymmetric conductor arranged to cause the shunting of the series field winding of each machine when such machine is running as motor.

15. In combination, a plurality of dynamo-electric machines mechanically connected to drive each other and arranged to run individually as either generators or motors, shunt and series field windings for each of said machines, and an asymmetric conductor in series with each of said series field windings for preventing flow of current therethrough save when the associated machine is running as generator.

16. In combination, a plurality of dynamo-electric machines mechanically connected to drive each other and arranged to run individually as either generators or motors, shunt and series field windings for each of said machines, and a plurality of asymmetric conductors associated with the series field winding of one of said machines for preventing flow of current through such winding save when that machine is operating as generator.

17. In combination, a plurality of dynamo-electric machines mechanically connected to drive each other and arranged to run individually as either generators or motors, shunt and series field windings for each of said machines, and an asymmetric conductor associated with the series field winding of each of said machines for preventing flow of current through such winding save when current is flowing through the armature of the same machine in a predetermined direction.

18. In combination, a plurality of dynamo-electric machines mechanically connected to drive each other and arranged to run individually as either generators or motors, shunt and series field windings for each of said machines, and an asymmetric conductor associated with each of said series field windings for allowing flow of current therethrough in one direction only.

19. In combination, a plurality of dynamo-electric machines mechanically connected to drive each other and each arranged to operate as either generator or motor, a plurality of field windings for each of said machines, and asymmetric conductors for preventing flow of current in one of the field windings of each machine save in a predetermined direction.

20. In combination, a direct current dynamo-electric machine the armature of which is subject to reversals of current flow, said machine having shunt and series field windings, and a shunt around the series field winding and an asymmetric conductor in series with the series field winding for preventing flow of current therethrough save in the predetermined direction.

21. In combination, a direct current dynamo-electric machine the armature of which is subject to reversals of current flow, said machine having shunt and series field windings, and a shunt around the series field winding and an asymmetric conductor in series with the series field winding for preventing flow of current therethrough save in the predetermined direction while allowing flow of current through the armature in either direction.

22. In combination, a direct current dynamo-electric machine the armature of which is subject to reversals of current flow, said machine having shunt and series field windings, and means for shunting said series field winding, said means including an asymmetric conductor coöperatively connected with said shunting means and serving to render the latter operative only for current in one direction.

23. In combination, a direct current dynamo-electric machine the armature of which is subject to reversals of current flow, said machine having shunt and series field windings, and two asymmetric conductors in series and shunt respectively to said series winding, said two asymmetric conductors being oppositely connected.

24. In combination, a direct current dynamo-electric machine the armature of which is subject to reversals of current flow, said machine having a plurality of field windings, and an asymmetric conductor connected in shunt to one of said field windings and operative to divert current from said field winding upon a difference in potential at its terminals in one direction only.

25. In combination, a direct current dynamo-electric machine the armature of which is subject to reversals of current flow, said machine having a field winding, and oppositely connected asymmetric conductors in shunt and series respectively with said field winding.

26. In combination, a direct current dynamo-electric machine the armature of which is subject to reversals of current flow, said machine having a field winding, a shunt around said field winding, and an asymmetric conductor located in said shunt and allowing flow of current therein in one direction only.

27. In combination, a direct current dynamo-electric machine the armature of which is subject to reversals of current flow, said machine having shunt and series field windings, a shunt around said series field winding, and an asymmetric conductor located in said shunt and allowing flow of current therein in one direction only.

28. In combination, a direct current dynamo-electric machine the armature of which is subject to reversals of current flow, said machine having a field winding, a shunt around said field winding, and an asymmetric conductor in series with said field winding and allowing flow of current therein in one direction only.

29. In combination, a direct current dynamo-electric machine the armature of which is subject to reversals of current flow, said machine having shunt and series field windings, a shunt around said series field winding, and an asymmetric conductor in series with said series field winding and allowing flow of current therein in one direction only.

30. In a multiple voltage system of distribution, more than three conductors, a balancer including more than two compound-wound dynamo-electric machines connected to said conductors, and means for automatically cutting out of service one of the field windings of one of said machines when that machine is acting as motor.

31. In a multiple voltage system of distribution, a source of current, two main conductors, two or more neutral conductors, a balancer set including three or more compound-wound dynamo-electric machines connected to said conductors, and automatic means for cutting out one of the field windings of one of said dynamo-electric machines when the currents in the different branches of the system become unequal.

32. In a multiple voltage system of distribution, four or more feeder conductors, three or more compound-wound dynamo-electric machines connected to said conductors and adapted to act as motors or generators to supply current to the branch or branches of the system which carry the heaviest currents in order to maintain the voltages at the proper values, and means for automatically short-circuiting the series field winding of any machine which acts as a motor to drive another machine as a generator when the currents are unequal.

33. In a multiple voltage system of distribution, more than three feeder conductors, a balancer consisting of three or more compound wound dynamo-electric machines mechanically connected together and electrically connected to the conductors of the system, and automatic means for rendering inoperative the series field of any machine which drives another as a generator when the currents become unequal.

34. In a multiple voltage system of distribution, a source of current, two main conductors, two or more neutral conductors, a balancer set including three or more dynamo-electric machines connected to said main and neutral conductors, series and shunt field windings for said machines, and means whereby the series field winding of each of said machines may be cut out of service when that machine is acting as motor.

35. In a multiple voltage system of distribution, more than three conductors, a balancer consisting of three or more compound-wound dynamo-electric machines connected to the conductors of the system, and automatic means for effectively transforming any of said dynamo-electric machines from a compound to a shunt wound machine when it is acting as a motor.

36. In a multiple voltage system of distribution, two main conductors, two or more compensating conductors, a balancer set including three or more dynamo-electric machines adapted to act as motors or generators, and means for cutting out of or into service the series field winding of each machine according as that machine is acting as motor or as generator.

37. In a multiple voltage system of distribution, two main conductors, two or more compensating conductors, a balancer set including one more compound-wound dynamo-electric machine than there are compensating conductors, and means for cutting out of or into service the series field winding of each machine according as the current in that branch of the system to which that machine is connected is less than or greater than the average current in the several branches.

38. In a multiple voltage system of distribution, two main conductors, a neutral or compensating conductor, a balancer comprising two compound-wound dynamo-electric machines each connected across one branch of the system, and independent means associated with each of said machines for cutting in or out the series field winding thereof according as that machine acts as generator or motor.

39. In a multiple voltage system of distribution, two main conductors, a plurality of neutral or compensating conductors, a balancer including a plurality of compound-wound dynamo-electric machines connected to said conductors, and asymmetric conductors for automatically cutting out of service one of the field windings of one of said machines when the ratio of the loads between the different conductors departs from normal.

40. In a multiple voltage system of distribution, two main conductors, a plurality of neutral conductors, a balancer set including more than two dynamo-electric machines connected to said main and neutral conductors, series and shunt field windings for said machines, and asymmetric conductors arranged to cut out the various series field windings save when the respective machines with which they are connected are acting as generators.

41. In a multiple voltage system of distribution, a plurality of feeder conductors including two main conductors and a plurality of compensating or neutral conductors, a balancer including more than two dynamo-electric machines connected to said conductors for supplying the balancing current, shunt and series field windings for each of said machines, the field windings of each machine being arranged to assist when such machine is acting as generator, and asymmetric conductors for preventing reversal of current in any of said series field windings.

42. In a multiple voltage system of distribution, two main conductors, a plurality of neutral or compensating conductors, a balancer comprising more than two compound-wound dynamo-electric machines each connected across one branch of the system, and independent means associated with each of said machines for cutting in or out the series field winding thereof according as that machine acts as generator or motor.

In testimony whereof I affix my signature, in the presence of two witnesses.

GEORGE B. SCHLEY.

Witnesses:
FLORENCE E. MACCARY,
FRED J. KINSEY.